Sept. 24, 1963
E. C. NIEGLOS
3,104,461
TIE ROD ADJUSTMENT TOOL
Filed Nov. 9, 1960
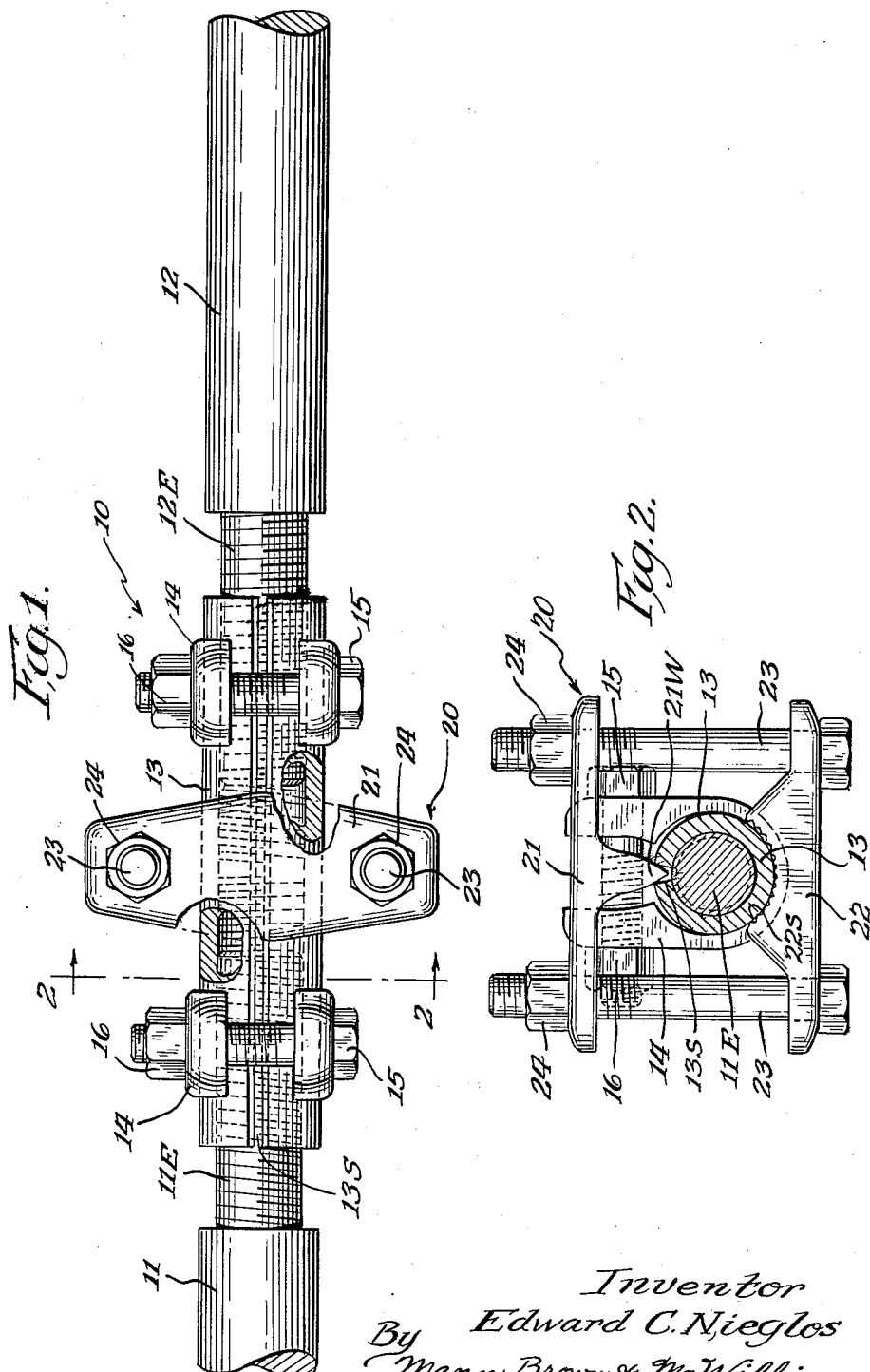
Inventor
Edward C. Nieglos
By
Mann, Brown & McWilliams
Attys.

United States Patent Office 3,104,461
Patented Sept. 24, 1963

3,104,461
TIE ROD ADJUSTMENT TOOL
Edward Carl Nieglos, 5756 W. School St., Chicago, Ill.
Filed Nov. 9, 1960, Ser. No. 68,306
2 Claims. (Cl. 29—282)

This invention relates to a tool for use in facilitating tie rod adjustments in the steering linkages of automobiles, and more particularly is concerned with a wedge action type of clamping tool for mounting about the usual split sleeve of a tie rod assembly to spread the sleeve sufficiently to accommodate convenient rotational adjustment thereof.

In the conventional steering linkage for automobiles, the positioning and orientation of each front wheel is adjustable by separate tie rod assemblies. Each such assembly includes the usual long and short tie rod ends threaded into opposite ends of a split sleeve which is normally fixed relative to the rod ends by a pair of U-clamp and bolt arrangements. Adjustments in the front wheel alignment are made by changing the effective length of the tie rod assemblies, this being accomplished by relaxing the grip of the U-clamps on the split sleeve to permit of rotating the sleeve.

This essentially simple adjustment procedure is often very difficult to execute. It frequently occurs that the split sleeve takes a permanent set from the effects of the continuous pressures exerted by the U-clamps. In these instances, relaxing of the grip of the U-clamps does not free the parts sufficiently to accommodate rotation of the split sleeve.

Normally, a wrench or similar turning tool is engaged on the split sleeve to rotate it for making the desired adjustments, but in many instances the clamping action of the wrench only serves to further tighten the sleeve on the rod ends and in effect freezes the sleeve against rotation.

The principal object of the present invention is to provide a tool for attachment to the split sleeve to facilitate its rotational adjustment.

Another object of the invention is to provide a tool having cooperating jaws engageable circumferentially about the sleeve and operable to undergo relative movement and expand the sleeve sufficiently to free it for convenient rotational adjustment.

Still another object of the invention is to provide a clamping tool for direct mounting about the sleeve and having a movable wedge enterable radially into the split sleeve to expand the sleeve circumferentially.

Other objects and advantages will become apparent during the course of the following description.

In the accompanying drawings forming a part of this specification and in which like numerals are employed to designate like parts throughout the same, FIG. 1 is a side elevational view illustrating a lengthwise adjustable tie rod assembly having the usual split sleeve on which the adjustment tool of this invention is shown applied; and FIG. 2 is a sectional view through the tie rod assembly and is taken on the line 2—2 of FIG. 1 to better illustrate the elements of the adjustment tool.

Referring now to the drawings, a tie rod assembly such as is conventionally utilized adjacent each front wheel in an automotive steering linkage is designated generally at 10 in FIG. 1 and includes a short tie rod 11 having a threaded end 11E of reduced diameter, a long tie rod 12 having an oppositely threaded end 12E of reduced diameter, and a split sleeve 13 having a lengthwise slot 13S and being internally threaded in an opposite sense at each of its opposite ends to cooperate with the threaded tie rod ends such that rotation of the sleeve with respect to the tie rod ends varies the effective length of the tie rod assembly. As is conventional, U-clamps 14 and bolts 15 and nuts 16 are applied around opposite ends of the split sleeve to grip it tightly against the corresponding rod ends and lock the parts against relative rotation and hence against undesired changes in length.

The adjustment tool of this invention is designated generally at 20 and is shown applied about the split sleeve 13 to facilitate rotational adjustment of this sleeve relative to the tie rod ends. In order to permit of rotational adjustment of the sleeve, the grip of the U-clamps 14 must be relaxed for the purpose of relaxing the tightness of the engagement of the split sleeve on the rod ends. In practice, however, it occurs that the split sleeve takes a permanent set and merely relaxing the U-clamps does not serve to free the parts sufficiently to accommodate rotational adjustment of the sleeve. It also happens that in using a wrench as a turning tool the clamping pressures that are necessarily applied to the split sleeve in connection with engaging the wrench may actually cause the tie rod parts to become frozen more tightly than the wrench is able to grip the exterior of the sleeve. These difficulties are eliminated by the use of the adjustment tool of this invention.

In a preferred form of the invention illustrated herein for purposes of disclosure, the tool includes separate plate-like upper and lower clamping jaws 21 and 22, respectively, arranged in opposing relation on opposite sides of the sleeve and interengaged by sets of fastener assemblies each of which is herein illustrated as comprising a bolt 23 and a nut 24, with each jaw being apertured adjacent each of its opposite ends to provide mounting holes for the clamping bolts 23.

The lower clamping jaw 22 has an arcuate seat 22S provided centrally thereof, and preferably having a serrated surface for engagement around a portion of the periphery of the split sleeve 13. The upper jaw 21 has a central wedge 21W provided integrally thereon to extend in opposing relation towards the arcuate seat 22S. As is illustrated in FIG. 2, the tool is applied to the split sleeve in such fashion that the wedge 21W is pointed into the lengthwise slot in the split sleeve and so that the arcuate seat 22S is engaged against the sleeve on a surface thereof that is opposite to the slot. The nuts 24 are then tightened on the bolts 23 to draw the jaws 21 and 22 together, and to force the wedge 21W further into the slot to spread the sleeve circumferentially. Simultaneously the serrated surface on the arcuate seat 22S establishes a gripping engagement against the opposite surface of the sleeve.

With the tool in place the sleeve may readily be rotated by wrench engagement which no longer is self-effecting because the spreader tool now positively prevents the wrench from causing a circumferential contraction of the sleeve. Alternatively, a suitable prying tool or even a hammer may be used against the spreader tool, or it may even be manipulated by hand for rotating the spreader sleeve.

It would be appreciated that in every instance the grip of the U-clamps on the ends of the split sleeve must first be relaxed prior to application of the spreader tool. It will also be apparent that the spreader tool may be embodied in the form of pivotally connected or loosely hinged jaws rather than completely separate jaws as illustrated herein for purposes of disclosure.

It should be understood that the description of the preferred form of the invention is for the purpose of complying with section 112, Title 35, of the U.S. Code and that the claims should be construed as broadly as prior art will permit.

I claim:
1. A spreader tool for facilitating adjustment of the effective length of a tie rod assembly, said assembly in- cluding spaced apart tie rod ends having externally threaded end portions, and a split sleeve having a lengthwise slot and being internally threaded in an opposite sense at each of its opposite ends to cooperate with the threaded portions of said tie rod ends such that rotation of the sleeve with respect to the tie rod ends varies the length of the assembly, said tool comprising first and second plate-like clamping jaws, each jaw having opposite ends and each jaw having a bolt hole adjacent each of its opposite ends, one of said jaws having a wedge centrally thereof and projecting laterally from the plane thereof and adapted for spreading engagement within said slot and the other of said jaws having an arcuate seat centrally thereof and projecting centrally from the plane thereof and adapted for gripping engagement against an external surface portion of said sleeve, bolts extending through the bolt holes at corresponding ends of said jaws, and nuts engageable on said bolts for drawing said jaws together when said jaws are assembled around said sleeve to force said wedge into said slot for expanding the sleeve circumferentially and to force said seat into gripping external engagement against said sleeve.

2. A spreader tool for facilitating adjustment of the effective length of a tie rod assembly, said assembly including spaced apart tie rod ends having externally threaded end portions, and a split sleeve having a lengthwise slot and being internally threaded in an opposite sense at each of its opposite ends to cooperate with the threaded portions of said tie rod ends such that rotation of the sleeve with respect to the tie rod ends varies the length of the assembly, said tool comprising first and second plate-like clamping jaws, said jaws having opposed ends and one of said jaws having a wedge centrally of its ends and projecting laterally from the plane thereof and adapted for spreading engagement within said slot and the other of said jaws having an arcuate seat centrally of its ends and adapted for gripping engagement against an external surface portion of said sleeve, first means interconnecting one set of corresponding ends of said jaws to connect said jaws for relative opening and closing movement to facilitate application of said tool circumferentially about said sleeve, and second means releasably interconnecting the other set of corresponding ends of said jaws and including adjustable mechanism removably engaged between said jaws and manually adjustable for drawing said jaws into clamping relation about said sleeve to force said wedge into said slot for expanding the sleeve circumferentially and to force said seat into gripping external engagement against said sleeve.

References Cited in the file of this patent
UNITED STATES PATENTS

| | | |
|---|---|---|
| 1,048,412 | Hutchinson | Dec. 24, 1912 |
| 1,475,744 | Brown | Nov. 27, 1923 |
| 1,785,870 | Marles | Dec. 23, 1930 |
| 2,352,290 | Saul et al. | June 27, 1944 |